United States Patent

[11] 3,601,264

[72] Inventor George F. Ritter, Jr.
Toledo, Ohio
[21] Appl. No. 877,263
[22] Filed Nov. 17, 1969
[45] Patented Aug. 24, 1971
[73] Assignee Libbey-Owens-Ford Company
Toledo, Ohio

[54] LOADING AND UNLOADING APPARATUS
9 Claims, 13 Drawing Figs.
[52] U.S. Cl. .................................................. 214/1 BH
[51] Int. Cl. ...................................................... B65g 61/00
[50] Field of Search ........................................... 214/1 BS, 1
BH, 1 BV, 1 S

[56] References Cited
UNITED STATES PATENTS
2,420,867 5/1947 Crosby .......................... 214/1 BH X
3,031,906 5/1962 Holman ........................ 214/1 BH X Primary Examiner—Robert G. Sheridan
Attorney—Collins and Oberlin ABSTRACT: Apparatus for automatically loading flat workpieces from a horizontal conveyor onto a constantly rotating worktable on which the workpieces are clamped. The invention includes a vacuum pickup device carried by articulate transfer means capable of deflecting in two directions to permit the pickup device to move in an arc about the axis of the worktable when the workpiece is simultaneously clamped on the worktable and gripped by the pickup device. The transfer means comprises a primary arm and a secondary arm resiliently held in a predetermined angular relationship, and a spring-loaded hinge mounting the pickup device to the secondary arm.

INVENTOR.
George F. Ritter, Jr.
BY Collins & Oberlin
ATTORNEYS

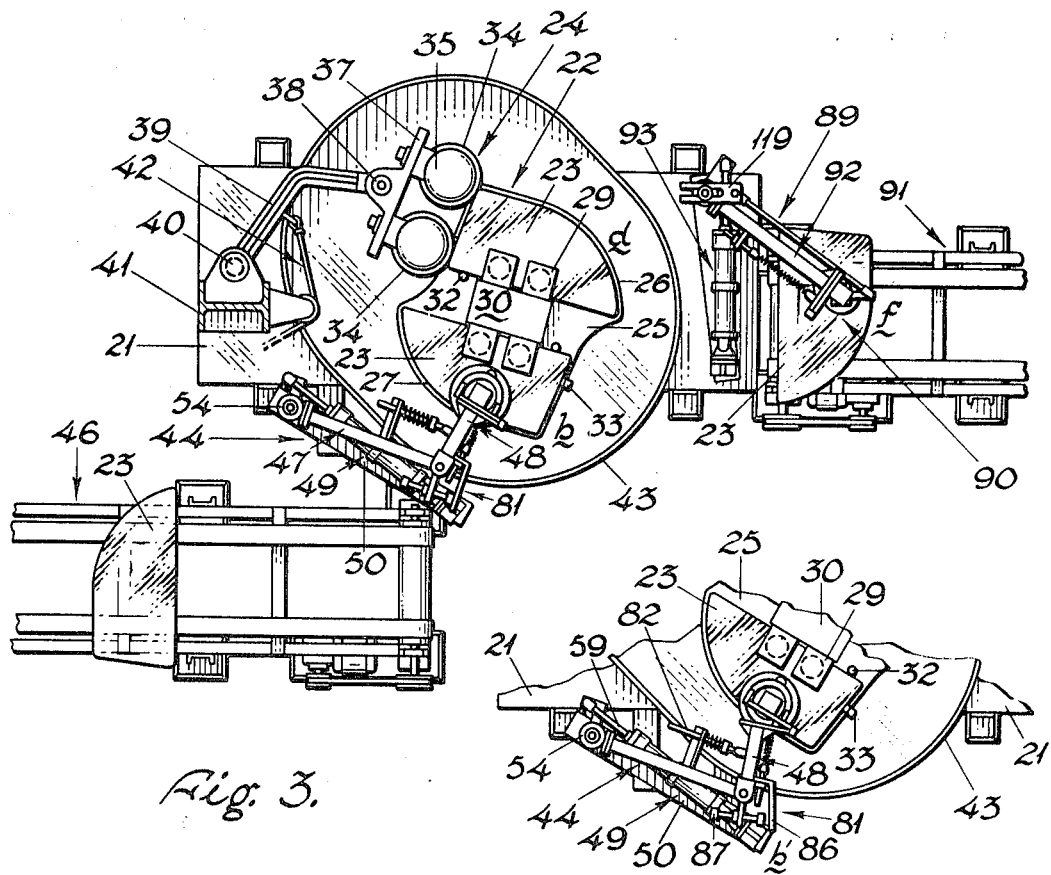
Fig. 3.
Fig. 3a.
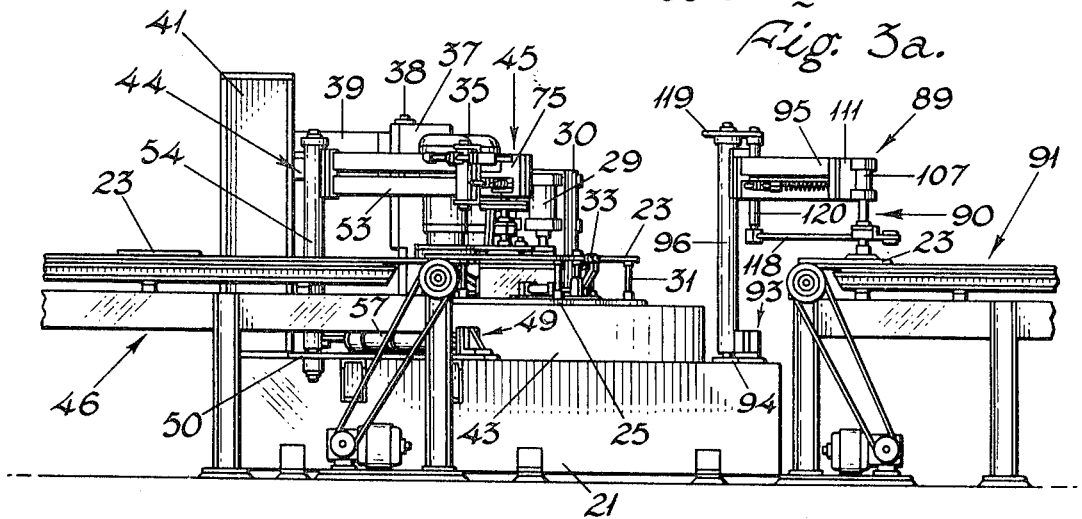
Fig. 4.

INVENTOR.
George F. Ritter, Jr.
BY
Collins & Oberlin
ATTORNEYS

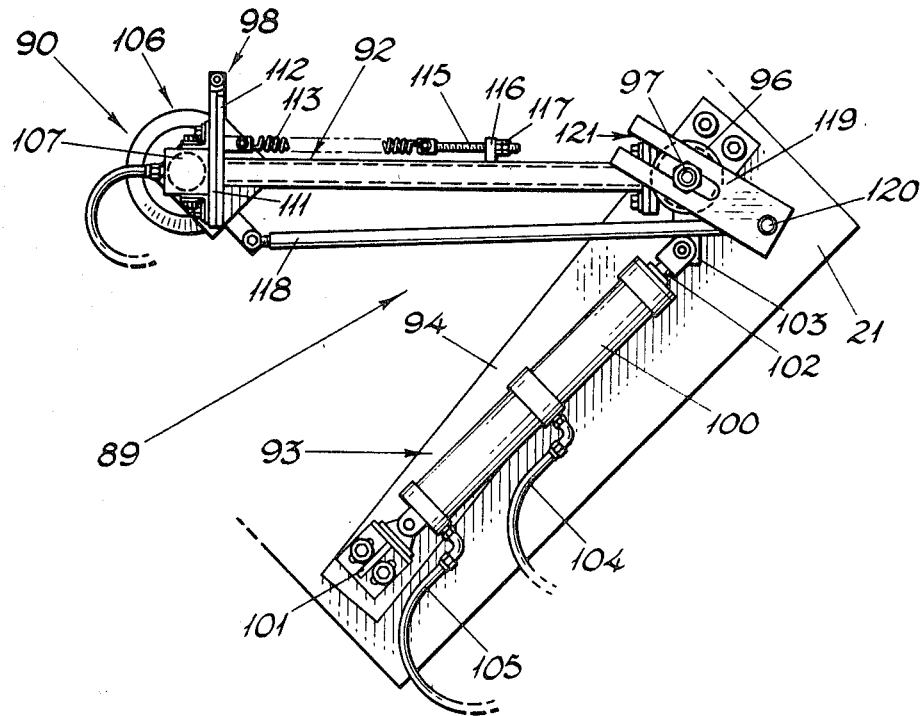
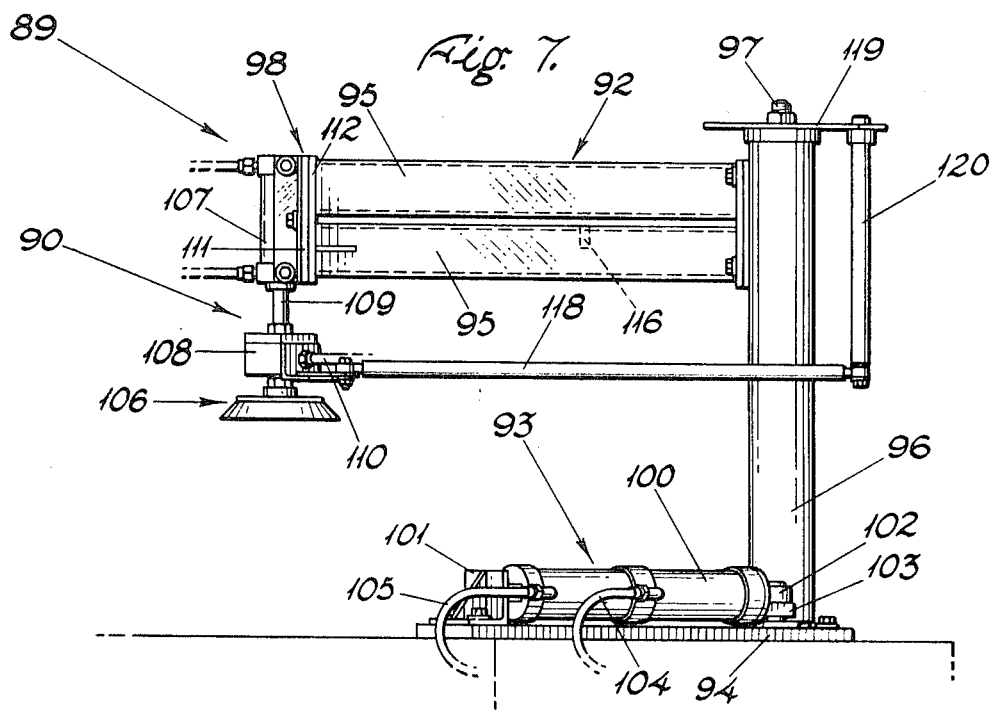
Fig. 7.
Fig. 8.

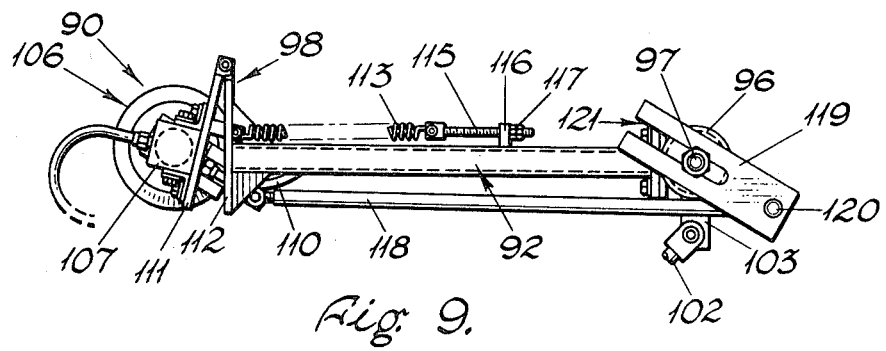
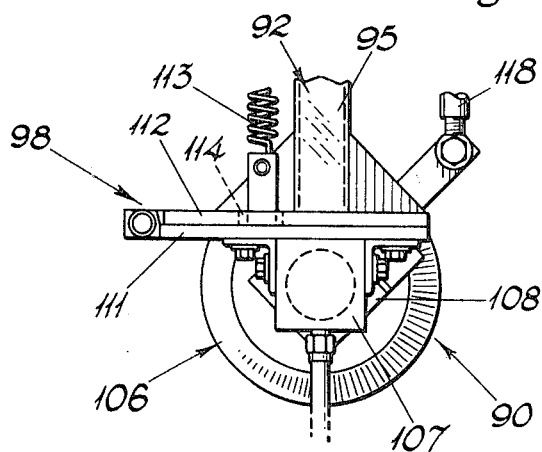
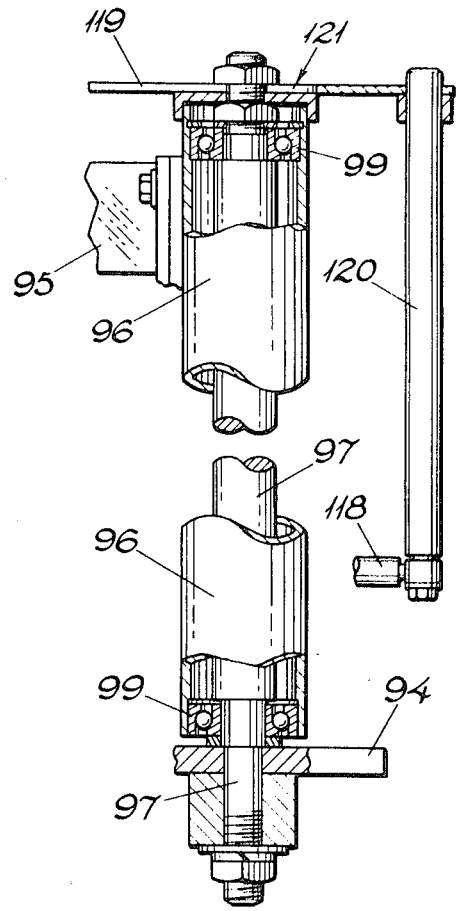
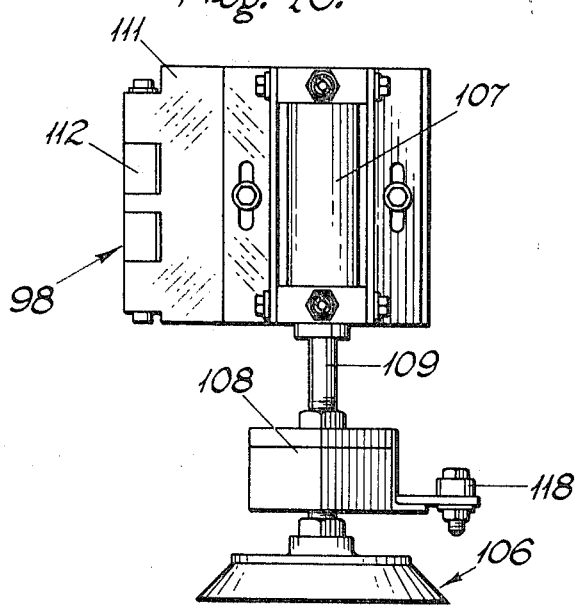

LOADING AND UNLOADING APPARATUS

The present invention relates to loading and unloading apparatus and more particularly to improved apparatus for automatically loading and unloading flat sheet materials to and from a constantly rotating horizontal worktable.

Although the present invention will be described herein in conjunction with a particular type of machine for grinding the curved edges of glass plates, it will be appreciated that it can also have utility when used with other types of machines which are similarly loaded and unloaded.

The grinding machine with which the present invention is illustratively described is the type employing two grinding units mounted side by side on a vertical support member which is pivotally mounted to permit the grinding units to swing horizontally as a unit about a common vertical axis during the grinding operation. The machine also includes a rotating worktable for supporting the plate for grinding, a template rotating with the worktable and having a contour conforming substantially to that of the plate being ground, and template follower rolls carried by the support member and engaging said template to determine the path taken by the respective grinding wheels as they traverse the curved edges of the plates.

Heretofore, machines of this type have been loaded and unloaded by hand, requiring at least two men to operate them if reasonable production rates are to be maintained.

Thus, the primary object of the present invention is to provide automatic means for loading and unloading a machine having a horizontally disposed worktable, such as an edging machine.

Another object of the invention is to provide an automatic loader and unloader which is capable of loading and unloading sheets onto a constantly rotating worktable.

Another object of the invention is to provide an automatic loader and unloader which is adaptable for use with sheets having a variety of sizes and shapes.

In the drawings, wherein like numerals are employed to designate like parts throughout the same:

FIG. 3 is a plan view similar to FIG. 1, but depicting the completion of the transfer process;

FIG. 3a is a plan view depicting the position of the loader after the worktable has rotated from the position shown in FIG. 3;

FIG. 4 is an elevation view of the apparatus as it is depicted in FIG. 3;

FIG. 7 is an enlarged plan view of the unloading apparatus;

FIG. 8 is an enlarged elevation view of the unloading apparatus;

FIG. 9 is an enlarged, fragmentary plan view of the unloading apparatus illustrating the hinged mounting for the vacuum pickup assembly;

FIG. 10 is an enlarged plan view of the vacuum pickup assembly as it is incorporated into the unloading apparatus;

FIG. 11 is an enlarged elevation view of the vacuum pickup assembly of FIG. 10; and FIG. 12 is a fragmentary, enlarged elevation view, shown partly in section, of means for pivotally mounting the unloading apparatus.

Figure 1:
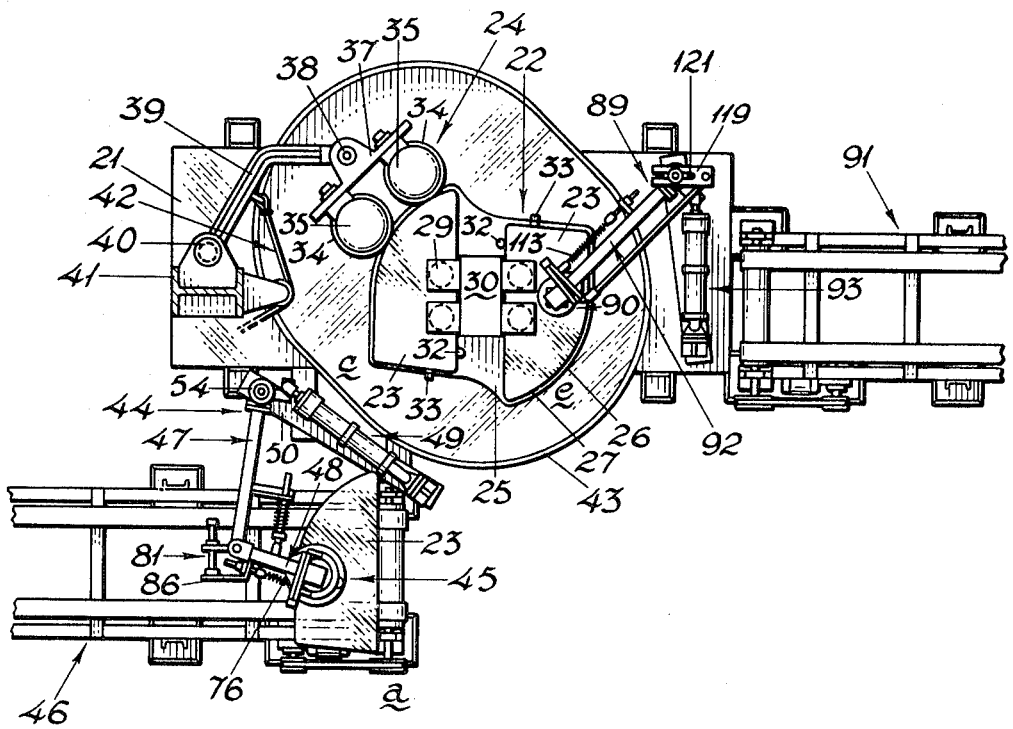
FIG. 1 is a plan view of loading and unloading apparatus constructed in accordance with the invention installed on edge grinding machine and depicted with the loading apparatus in position to start transferring a workpiece from a conveyor to the worktable and the unloading apparatus in position to start transferring a workpiece from the worktable to a conveyor.

Referring to the drawings, and particularly to FIGS. 1–4, the edge grinding machine comprises a supporting base 21, a rotating worktable 22 on which the glass plates 23 to be ground are mounted, and the grinding mechanism, designated generally by the numeral 24. The worktable 22 is mounted at the end of a vertical spindle which is constantly rotated at a relatively low speed by a suitable drive system (not shown). The worktable 22 carries a template 25 on its lower surface, with the glass plates or workpieces 23 being supported on its upper surface. The template is formed to include two curved areas 26 which are shaped to the curvature of the corresponding edges 27 of the plate to be ground.

Figure 2:
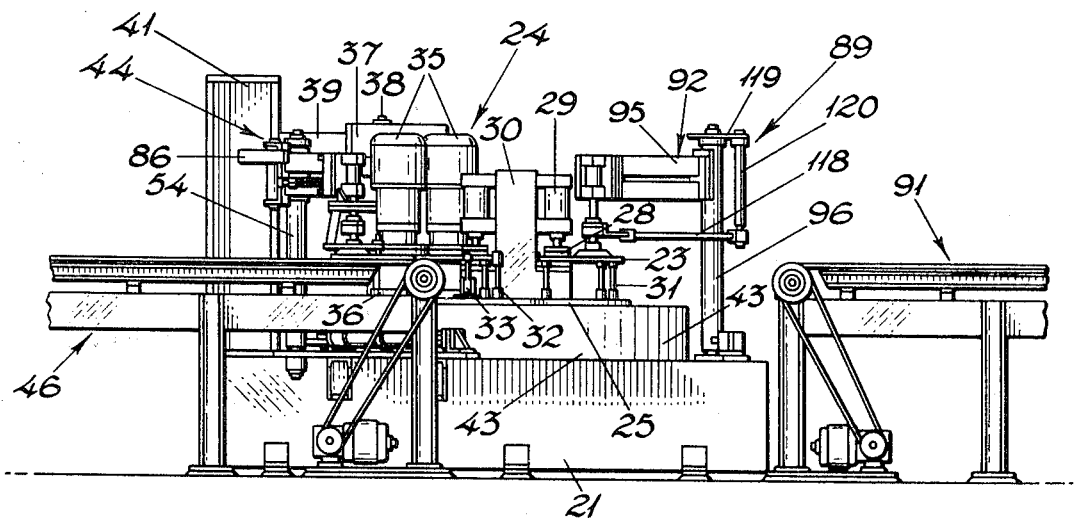
FIG. 2 is an elevation view of the apparatus as it is depicted in FIG. 1.

The worktable 22 is provided with means for carrying at least two plates 23 which are positioned, as shown in FIGS. 1 and 3, on the worktable and held in place by clamping plates 28, each having a nonabrasive surface for engaging the respective workpiece. The clamping plates are mounted for vertical reciprocal movement by air cylinders 29 carried by a vertical wall 30 extending above the worktable. As shown, two clamping plates and air cylinders are provided for clamping each workpiece 23 to the worktable, with the workpieces positioned in such a manner that the edges to be ground extend beyond the edge of the worktable as shown in FIGS. 2 and 4. This permits one piece to be loaded to or unloaded from the worktable while the other is being ground. A plurality of support rods 31 upstanding from the top surface of the template 25 receive the overhanging edges of the workpiece 23. Fixed guides 32 and retractable stops 33, also mounted on the template 25 set the position of the workpiece on the worktable.

The grinding mechanism 24 comprises two grinding units, each including a grinding wheel 34 rotated about a vertical axis by an electric motor 35. Each grinding unit is provided with a template follower roll 36 aligned axially with the related grinding wheel 34. As the worktable rotates, the template follower rolls 36 traverse the edges of the template 25 to guide the grinding wheels 34 against the edges of the workpieces 23.

The grinding units are mounted side by side on a vertical support member 37 that is adapted to pivot freely about one vertical axis while the entire grinding mechanism 24 can swing about a second vertical axis. Specifically, the support member is pivotally mounted at 38 on a horizontally disposed arm 39, which in turn is pivotally mounted at 40 to a vertical support member 41 upstanding from the supporting base 21.

To maintain a substantially constant grinding pressure against the workpiece, means are provided to exert a constant force on the arm 39 urging it in a clockwise direction about the pivot 40 as viewed in FIGS. 1 and 3. As the workpiece rotates in contact with the grinding wheels 34 the entire grinding mechanism pivots about point 40 and the individual units pivot about point 38 to follow the contour of the workpiece. Generally, the constant force required is provided by a hanging weight acting on the arm 39 by means of a cord and a system of pulleys designated generally by the numeral 42. A panlike shield 43 surrounds the worktable and grinding mechanism to contain the wet grinding materials.

LOADER

Figure 5:
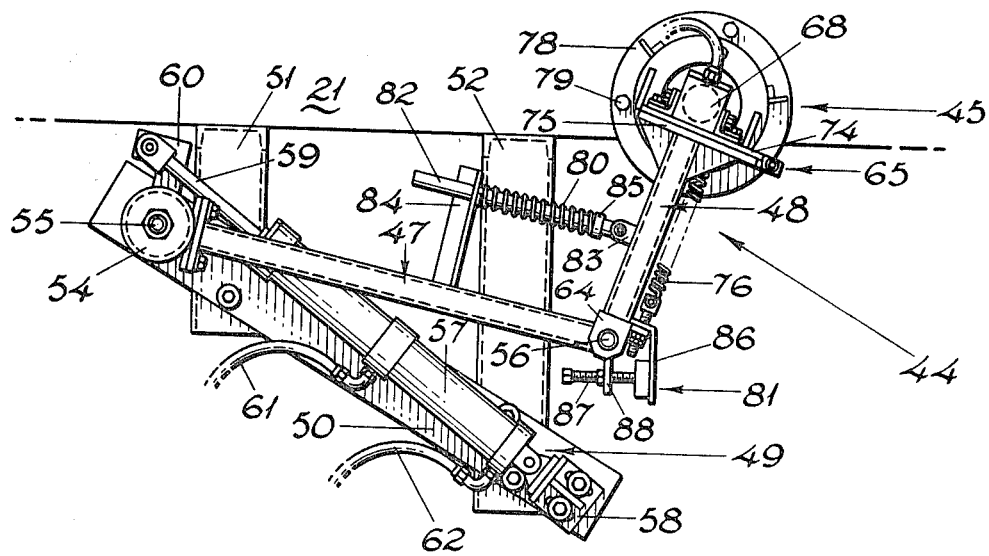
FIG. 5 is an enlarged plan view of the loading apparatus.
Figure 6:
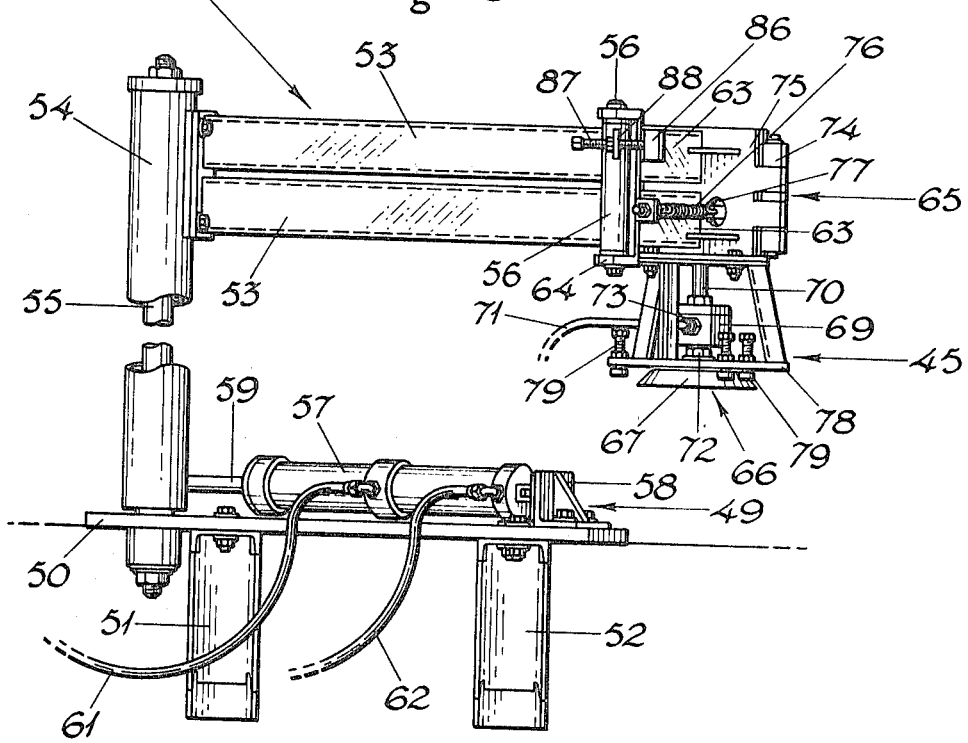
FIG. 6 is an enlarged elevation view of the loading apparatus with parts cut away.

Referring particularly to FIGS. 5 and 6, the loader, designated generally by the numeral 44 comprises a vacuum pickup assembly 45 which is capable of gripping a glass plate 23 for transfer from a conveyor 46 (FIGS. 1–4) to the worktable 22, a primary arm 47 mounted between the grinding mechanism and the conveyor for swinging movement in a horizontal plane, a secondary arm 48 carrying the pickup assembly and pivotally connected to the free end of the primary arm for movement in a horizontal plane above the conveyor and worktable 22, and an actuator 49 which swings the pickup assembly from a first position above the conveyor to a second position above the worktable.

Referring particularly to FIGS. 5 and 6, the primary arm 47 and the actuator 49 are mounted on an elongated base plate 50 spaced outward from the worktable, beyond the shield 43, by rectangular standoffs 51 and 52 extending outward from the supporting base 21. The primary arm 47 is made of two box section rails 53 bolted or otherwise fastened at one end to a vertically disposed cylindrical post 54 mounted for rotation on a fixed rod 55 upstanding from the base plate 50, and at the other end to a pivot pin 56 about which the secondary arm 48 rotates. The actuator 49 comprises a pressure cylinder 57 pivotally mounted on the base plate 50 by means of a bracket 58 and having its ram 59 pivotally connected to the base of the post 54 through an L-shaped bracket 60 welded or otherwise fastened to the post. Air or other pressurized fluid is supplied to the cylinder via lines 61 and 62 from a suitable source (not shown).

The secondary arm 48 comprises a pair of rails 63, similar to rails 53, attached at one end to a U-shaped bracket 64 which is received on the ends of the pivot pin 56, and at the other end to a hinged mounting plate assembly 65 which supports the pickup assembly 45.

The pickup assembly 45 comprises a vacuum cup or sucker 66 having a resilient, nonabrasive glass contacting element 67, a pressure cylinder 68, adapted to move the sucker 66 into and out of contact with a workpiece being loaded, and a vacuum chamber 69 which serves as a mechanical connection between the ram 70 of the cylinder 68 and the sucker 66, and connects the center of the sucker to a source of vacuum via line 71. In the illustrative embodiment, the vacuum chamber 69 is simply a rectangular box with the ram 70 threaded into the top and the sucker connected to the bottom by a pipe connection 72 which is aligned with the axis of the ram 70. The vacuum line 71 is connected to the side of the box by a connector 73.

The vacuum pickup assembly 45 is mounted on a flat, vertically disposed plate 74 which forms half of the hinged mounting plate assembly 65. The other hinge half 75 is fastened directly to the secondary arm rails 63. A spring 76 connected to hinge half 74 through a hole 77 in hinge half 75 and to the U-shaped bracket 64 maintains the hinge in a normally closed position with the halves 74 and 75 in face-to-face relationship.

Since the glass plate or workpiece to be ground must be accurately oriented when it is placed onto the worktable 22, a locating ring 78 depends from the pickup assembly and surrounds the sucker 66. Adjusting bolts 79 threaded through the ring 78 can be adjusted so that when a plate 23 is picked up by the sucker it will be held in a horizontal plane for placement between the clamping plates 28 and the worktable 22. The pickup assembly is mounted on the hinge plate 74 by means of a bolt and slot arrangement similar to that shown in FIG. 11 to adjust the height to which a workpiece is lifted.

The normal angle between the primary and secondary arms is determined by the position of a spring 80 extending between them and by a stop assembly 81 (FIG. 5). The spring surrounds a rod 82 connected to the secondary arm by means of a clevis 83, and slides through a hole in an angle bracket 84 extending outward from the side of the primary arm 47. The spring 80 acts between the vertical leg of the bracket 84 and a collar 85 attached to the rod 82. As shown in FIGS. 1 and 5, the spring 80 is in its normal, unloaded condition. The stop assembly 81 sets the maximum angle between the two arms and comprises a stop bracket 86 which is attached to the U-shaped bracket 64 and forms part of the mounting means for the spring 76, and a stop screw 87 threaded through a plate 88 extending out from the pivot pin 56.

Referring particularly to FIGS. 1, 3 and 3a, the location of the arms 47 and 48, their relative lengths, and the angle between them are selected such that the sucker 66 of the pickup assembly 45 can pick up a workpiece in the position designated as $a$ in FIG. 1 and swing it over to the worktable 22 which by that time will have rotated in the direction shown by the arrow to receive the workpiece in the position designated as $b$ in FIG. 3. As soon as the workpiece is in position beneath the clamping plates 28 they will descend to hold the workpiece on the worktable 22 while at the same time the vacuum is released from sucker 66. Since the table 22 is rotating continuously during this interval the spring connection between the two arms, and the hinged mounting plate assembly permit the vacuum pickup assembly 45 to move in two directions as shown in FIG. 3a to follow the rotating table until the sucker 66 actually breaks loose from the plate (position $b'$). Once the sucker is removed the springs permit the arms and the pickup assembly to move back to their normal positions.

The relative movement provided between the primary and secondary arms and within the hinge assembly permit some leeway in the timing between the conveyor and the worktable; however, the movement of the conveyor must still be correlated with that of the worktable. This can be accomplished by conventional means such as variable speed drives and/or limit switches which stop and start the conveyor according to the relative position of the worktable. In the illustrative embodiment, the conveyor 46 is stopped when a workpiece 23 reaches position $a$ of FIG. 1. Thereafter, relays and the like control the raising and lowering of the sucker 66 and application of vacuum to it, and the energization of actuator 49. Limit switches then control the return of the loader to its original position as shown in FIG. 1.

UNLOADER

Referring again to FIGS. 1 to 4, and particularly to FIGS. 7 and 8, the unloader, designated generally by the numeral 89, is similar to the loader 44, although somewhat simpler since alignment of the workpiece is not so critical in the unloading operation. Essentially, the unloader comprises a vacuum pickup assembly 90, adapted to lift a ground plate or workpiece 23 from the worktable 22 and deposit it on unloader conveyor 91, a pivot arm 92 which swings the pickup assembly from a first position above the plate on the worktable to a second position above the conveyor, and an actuator 93 which provides the necessary pivoting movement of the arm 92.

The pivot arm 92 and actuator 93 are mounted on an elongated baseplate 94 which is bolted or otherwise fastened directly to the supporting base 21. The arm 92 is made up of two box section rails 95 attached at one end to a vertically disposed cylindrical post 96 mounted for rotation on a rod 97 (FIG 12) upstanding from the base plate 94, and at the other end directly to a hinged mounting plate assembly 98, similar to the assembly 65 associated with the loader, which supports the vacuum pickup assembly 90. The mounting details of the post 96 as shown in FIG. 12, including ball bearings 99 mounted between the post 96 and the rod 97, are also applicable to the post 54 of the loader.

The actuator 93 comprises a pressure cylinder 100 pivotally mounted on the baseplate 94 by means of an angle bracket 101 and having a ram 102 pivotally connected to the base of the post 96 through a bracket 103 welded or otherwise fastened to the post. Air or other pressurized fluid is supplied to the cylinder 100 via lines 104 and 105 from a suitable source (not shown).

The vacuum pickup assembly 90, is substantially identical to that provided on the loader, comprising a vacuum cup or sucker 106, a pressure cylinder 107, and a vacuum chamber 108 connecting the ram 109 to the cylinder 107 to the sucker and the sucker to its vacuum source via line 110. The pickup assembly 90 is mounted on a flat plate 111 which forms half of the hinged mounting plate assembly 98. The other hinge half 112 is fastened directly to the pivot arm rails 95. A spring 113 connected to hinge half 111 through a hole 114 in hinge half 112 and to the pivot arm 92 maintains the hinge in a normally closed position. The connection to the arm 92 is adjustable to vary the tension in the spring 113, by means of a threaded rod 115 connected at one end to the spring and at the other end extending through a bracket 116 attached to the lower of the rails 95. Locknuts 117 maintain a set position of the spring.

Since exact alignment of the ground workpiece on the conveyor 91 is not critical, a locating ring, such as that (78) provided for the loader is not required. However, since the unloader is located such that the plates are unloaded from a position in direct line with the conveyor 91 along a radial line running through the axis of rotation of the worktable (see FIGS. 1 and 3) provision is made to maintain the angular orientation of the plate relative to the conveyor as it is transferred thereto. For this purpose, a link rod 118 is pivotally attached between the vacuum chamber 108 and a plate 119 mounted in a fixed position on the upper end of rod 97. Because of the difference in height between the vacuum chamber 108 and the end of the rod 97 they are connected together by a vertical connecting rod 120. As the pivot arm 92 rotates about the rod 97 from the position shown in FIG. 1 to that shown in FIG. 3, the link rod 118 maintains the angular position of the pickup assembly so that the workpiece 23 does not rotate as it is swung from the worktable to the conveyor. The plate 119 is slotted at 121 to provide adjustment of the link rod action.

In order to allow the vacuum pickup assembly to rotate slightly with the worktable after the sucker 106 becomes attached to the workpiece and before the workpiece is removed therefrom, the hinged mounting assembly 98 is capable of opening, against the force of spring 113, to the position shown in FIGS. 1 and 9. Although opening of the hinge 98 changes the angular position of the pickup head, it returns to normal once the external force represented by the rotation of the worktable is removed so that when the workpiece reaches the conveyor there is no net change in its angular orientation.

As with the loader the action of the unloader is controlled through the use of well-known drive and control devices, although somewhat simplified by the fact that precise coordination of the movement of the conveyor 91 with that of the worktable is not required.

OPERATION

Referring to FIG. 1, the timing of the various components is set up so that when the worktable is in the position shown, a workpiece 23 to be ground will be at the end of conveyor 46 in position *a*, and the actuator 49 will be fully retracted to place the pickup assembly 45 in position over the workpiece 23. At this point hinge 65 is closed and spring 80, in conjunction with the stop assembly 81, is acting between the primary and secondary arms 47 and 48 to maintain the position of the pickup assembly relative to the conveyor and to the worktable.

When the pickup assembly is in position over the workpiece, pressure is applied to the top of cylinder 68 to drop the sucker 66 onto the workpiece and at the same time a vacuum is pulled on the sucker to clamp the workpiece firmly against it.

Pressure is then applied to the bottom of cylinder 68 to raise the workpiece to a predetermined height according to the position of the pickup assembly on the hinge plate 74. The bolts 79 on adjusting ring 78 are set so that they define horizontal plane and just contact the workpiece when it is in its highest position. The ram 59 of actuating cylinder 57 is then extended to swing the pickup assembly over to the rotating worktable in position *b* of FIG. 3. When the workpiece arrives at position *b* beneath the clamping plates 28, the workpiece is lowered and pressure is applied to cylinders 29 to firmly clamp the workpiece to the table, whereupon the vacuum is removed from the sucker 66 and the workpiece raised again. During the time lag between clamping and removal of the vacuum and the breaking loose of the sucker, the pickup head is allowed to move with the worktable to position *b'* of FIG. 3a due to the relative movement provided between the primary and secondary arms 47 and 48 and within the hinge assembly 65 as illustrated in FIG. 3. Once the workpiece is free of the pickup assembly the arms and hinge return to their normal positions and the actuator 49 is retracted to place the pickup assembly in position to transfer the next workpiece.

Referring again to FIG. 1, at this time the worktable will have rotated to place the workpiece 23 in position *c* with the grinding wheels 34 starting to grind the curved edges thereof. When the workpiece arrives at position *d* of FIG. 3 grinding is nearly completed and further rotation of the worktable brings it to position *e* of FIG. 1 where it can be picked up by the unloader 89.

When the workpiece reaches position *e* the actuator 93 will have been fully retracted to place the pickup assembly 90 in position above the finished workpiece. Pressure is then applied to the top of cylinder 107 to drop the sucker 106 and a vacuum is pulled thereon to grip the workpiece. The ram 102 of the actuating cylinder 100 is then extended while the pressure is released from the clamping plates 28 and pressure applied to the bottom of cylinder 107 to lift the workpiece from the table 22. The hinge assembly 98 compensates for the time lag between application of the vacuum to the sucker and the release of the clamping plates by opening, against the force of spring 113, to the position illustrated in FIGS. 1 and 9.

The actuator 93 is then extended to swing the workpiece over to the conveyor to position *f* of FIG. 3 whereupon the sucker is lowered and the vacuum released to drop the workpiece on the conveyor. The sucker is then raised to allow the workpiece to travel down the conveyor 91 for further fabrication.

Although the apparatus has been described herein as comprising a separate and distinct loader 44 and unloader 89, it is considered to be apparent that the more complex loader 44 can be used effectively as an unloader as well, if this is warranted by the positioning of the conveyors, configuration of the workpiece, etc.

I claim:

1. Apparatus for transferring horizontally disposed, substantially flat workpieces between a horizontal conveyor and a horizontal rotating worktable, said worktable including means for clamping a workpiece thereon for rotation therewith; comprising a first arm mounted at one end for swinging movement in a horizontal plane; a second arm pivotally mounted at one end to the other end of said first arm for swinging movement relative thereto in a horizontal plane above said conveyor and worktable; a pickup device mounted on the free end of said second arm, said pickup device including a vacuum sucker engageable with the upper surface of a horizontally disposed workpiece; means for moving said sucker into and out of engagement with said surface; means for applying and releasing a vacuum on said sucker to selectively grip and release a workpiece engaged thereby; means for limiting the angle between said arms to a preselected value; resilient means acting between said arms to maintain them normally at said preselected angle; and actuating means operatively associated with said first arm for swinging said arms and the pickup device between a first position wherein said pickup device is disposed above said conveyor and a second position wherein said pickup device is disposed above said worktable to place a workpiece in position to be clamped thereon by said clamping means; said first and second arms being capable of deflecting relative to one another against the force of said resilient means when said workpiece is simultaneously gripped by said sucker and by said clamping means.

2. Apparatus for transferring workpieces as claimed in claim 1, in which said resilient means acting between said first and second arms comprises a compression spring.

3. Apparatus for transferring workpieces as claimed in claim 1, in which said pickup device comprises a pressure cylinder having a vertically disposed ram; a vacuum chamber fixed to the free end of said ram; means mounting said sucker to said chamber in substantial vertical alignment with said ram, said mounting means including a passageway connecting the center of said sucker to the interior of said chamber, and means connecting said chamber to a vacuum source.

4. Apparatus for transferring workpieces as claimed in claim 1, in which said pickup device includes means for maintaining a workpiece engaged by said sucker in a predetermined horizontal plane.

5. Apparatus for transferring workpieces as claimed in claim 4, in which said means for maintaining a workpiece in a predetermined horizontal plane comprises a ring surrounding said sucker, and a plurality of projections extending downward from said ring and being engageable with the surface of a workpiece gripped by said sucker.

6. Apparatus for transferring workpieces as claimed in claim 1, including hinge means mounting said pickup device to said second arm, said hinge means comprising a first hinge plate rigidly attached to the end of said arm, a second, movable hinge plate attached to said pickup device and pivotally connected to the first hinge plate for swinging movement in a horizontal plane, and resilient means maintaining said hinge plates normally in face-to-face contact; said hinge plates being capable of deflecting relative to one another to open said hinge against the force of said resilient means when a workpiece is simultaneously gripped by said sucker and by said clamping means on said worktable, the combined deflection of said arms and said hinge means permitting the pickup device to rotate about the axis of said worktable while said first arm remains in a fixed position.

7. Apparatus for transferring workpieces as claimed in claim 6, in which said resilient means comprises a spring connecting said movable hinge plate and said second arm and urging said hinge plates together.

8. Apparatus for transferring workpieces as claimed in claim 6, in which said pickup device comprises a pressure cylinder attached to said movable hinge plate, said pressure cylinder having a vertically disposed ram with said sucker being mounted at the free end of said ram; means connecting said sucker to a source of vacuum; and guide means attached to said movable hinge plate and engageable with a workpiece gripped by said sucker for maintaining said workpiece in a predetermined horizontal plane.

9. Apparatus for transferring workpieces as claimed in claim 1, in which said first arm is mounted on a vertical post rotatable on a vertical axis, said actuating means comprising a horizontally disposed pressure cylinder operatively connected between a fixed point and said post at a point spaced from the axis thereof.